United States Patent
Roberts et al.

(10) Patent No.: US 7,690,705 B1
(45) Date of Patent: Apr. 6, 2010

(54) VACUUM CHUCK USEFUL FOR AFFIXING COVER SEALS TO HARD DISK DRIVES

(75) Inventors: Lawrence Matthew Roberts, Pleasanton, CA (US); Joselito S. Jose, Fremont, CA (US); Lidu Huang, Danville, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 558 days.

(21) Appl. No.: 11/644,404

(22) Filed: Dec. 21, 2006

(51) Int. Cl.
*B25J 15/06* (2006.01)
(52) U.S. Cl. .................................. 294/64.1; 294/902
(58) Field of Classification Search ............. 294/64.1, 294/119.3, 902; 901/40; 269/21
See application file for complete search history.

(56) References Cited

U.S. PATENT DOCUMENTS

| | | | | |
|---|---|---|---|---|
| 3,913,307 A * | 10/1975 | Cardinal, Jr. | ............... | 56/328.1 |
| 4,529,353 A * | 7/1985 | Dean et al. | ................. | 414/810 |
| 4,557,514 A * | 12/1985 | Cushman et al. | ........... | 294/64.1 |
| 4,593,947 A * | 6/1986 | Yocum | ...................... | 294/64.1 |
| 4,620,738 A * | 11/1986 | Schwartz et al. | ........... | 294/64.1 |
| 5,207,465 A * | 5/1993 | Rich | ............................. | 294/2 |
| 5,685,513 A * | 11/1997 | Tsukushi | .................... | 248/363 |
| 5,865,827 A * | 2/1999 | Bullister | ....................... | 606/1 |
| 6,394,520 B1 * | 5/2002 | Quick et al. | ............... | 294/64.1 |
| 6,517,130 B1 * | 2/2003 | Donoso et al. | ............ | 294/64.1 |

\* cited by examiner

*Primary Examiner*—Dean J Kramer

(57) ABSTRACT

A vacuum chuck includes a first surface with a cavity formed in the first surface, a second surface opposite the first surface, and a relatively deformable portion disposed between the first surface and the second surface. The vacuum chuck is formed using a resilient material, and the relatively deformable portion changes shape in response to pressure more easily than other portions of the vacuum chuck.

9 Claims, 1 Drawing Sheet

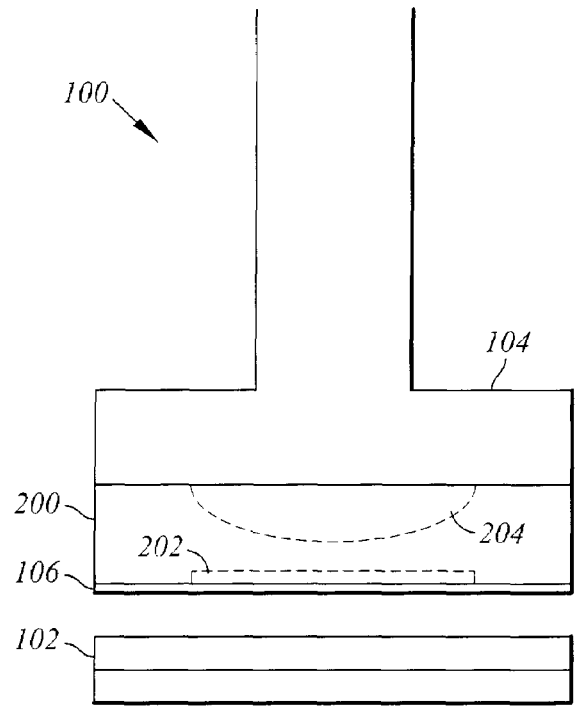
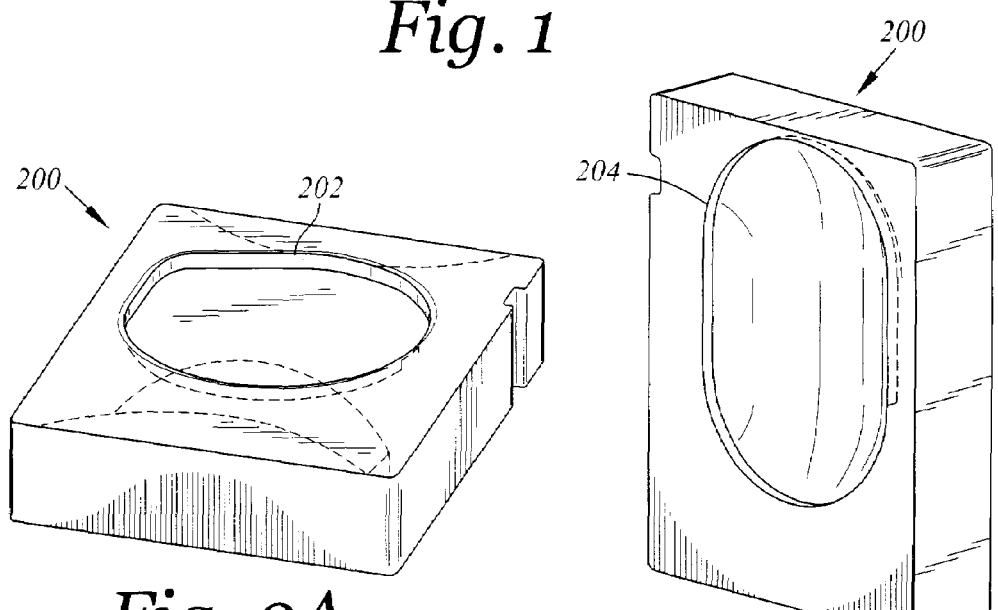
Fig. 1
Fig. 2A  Fig. 2B

VACUUM CHUCK USEFUL FOR AFFIXING COVER SEALS TO HARD DISK DRIVES

FIELD OF THE INVENTION

The present invention relates to manufacturing processes, and more particularly, to a vacuum chuck useful for affixing cover seals to hard disk drives.

BACKGROUND

Placement of cover seals on hard disk drives (HDDs) present considerable technical challenges. The cover seal should be pressed onto the drive with sufficient force to form a good seal, applied to avoid bubble formation under the seal. In bringing the pressure on the label to a sufficient level to place the cover seal, the pressure can build up at different rates on different areas of the cover. This can cause the cover to deform, which can be particularly problematic when the surface is located to a high degree of precision with respect to other components of an article being manufactured. Particularly in small form factor HDDs, components like the breather filter and the magnetic media are held apart from one another to prevent drive failure that could result from contact between them. Consequently, it is desirable to have an apparatus for placing cover seals that provides sufficient pressure to secure the cover seal, but that does not exert excessive pressure on areas of the drive that are particularly sensitive.

SUMMARY

In a particular embodiment of the present invention, a vacuum chuck includes a first surface with a cavity formed in the first surface, a second surface opposite the first surface, and a relatively deformable portion disposed between the first surface and the second surface, wherein the vacuum chuck is formed using a resilient material and the relatively deformable portion changes shape in response to pressure more easily than other portions of the vacuum chuck. In particular embodiments, the relatively deformable portion may be an air-filled bladder formed in the vacuum chuck. In other embodiments, the relatively deformable portion may be a resilient material with a lower hardness than another resilient material used in forming the vacuum chuck.

BRIEF DESCRIPTION OF SEVERAL VIEWS OF THE DRAWINGS

FIG. 1 depicts a system for placing a cover seal on an HDD according to a particular embodiment of the present invention.

FIGS. 2A and 2B depicts views of a seal-facing surface and a surface opposite the seal-facing surface, respectively, of a vacuum chuck used in the system of FIG. 1 according to a particular embodiment of the invention.

DETAILED DESCRIPTION OF PREFERRED EXEMPLARY EMBODIMENTS

FIG. 1 is a schematic diagram of a system 100 used to affix a cover seal to a hard disk drive (HDD) 102 that includes an arm 104 holding a vacuum chuck 200. A cover seal 106 is held to the vacuum chuck 200 by placing the seal 106 against the vacuum chuck 200 and creating suction through the vacuum chuck 200, such as by creating negative pressure through apertures (not shown) in the vacuum chuck 200. The arm 104 is used to press the seal 106 against the HDD 102, which in conventional systems can produce an uneven buildup of pressure on the cover of the HDD 102.

One conventional technique for producing a more uniform pressure buildup is to use different thicknesses and/or hardnesses of material on the seal-facing side of the vacuum chuck 200. Such modifications may be difficult to produce, and even if these modifications are made, the improvement in the uniformity of pressure buildup may not be significant. Another technique for producing a more uniform pressure buildup is to place a cavity 202 in the surface of the vacuum chuck 200 facing the seal 106. An advantage of placing the cavity 202 in the surface of the vacuum chuck 200 is that pressing down on the vacuum chuck 200 initially builds up the pressure below the cavity 202 at a slightly higher rate than at the edges of the vacuum chuck 200, which can desirably drive air to the edges of the cover seal 106 to reduce the likelihood of bubble formation. However, as the vacuum chuck 200 continues to be pressed downward, the pressure may build up around the cavity 202 at a disproportionately high rate.

Particular embodiments of the present invention use a relatively deformable portion 204 of the vacuum chuck 200 that changes shape in response to pressure more easily than other portions of the vacuum chuck 200. Preferably, the deformation of the relatively deformable portion 204 will not ordinarily be plastic deformation, so that the lifetime of the vacuum chuck 200 can be extended. In a particular embodiment, the deformable portion 204 of the vacuum chuck 200 is produced by forming an air-filled bladder disposed between the cavity 202 and the arm 104. The deformable portion 204 yields to the pressure buildup around the edges of the cavity 202, which allows the pressure on the seal-facing surface of the vacuum chuck 200 to be distributed to avoid excessive pressure around the cavity 202. In particular embodiments, the vacuum chuck 200 redistributes pressure around the cavity 202 to the outer edges of the HDD 102. The outer edges of the HDD are less likely to deform, and they are also relatively far from components of the drive most likely to be damaged by pressure on the cover.

FIGS. 2A and 2B shows an example embodiment of the vacuum chuck 200 in more detail, as viewed on the seal-facing surface and the opposite surface, respectively. The vacuum chuck 200 may be formed from any suitably resilient material, such as polyurethane. The relatively deformable portion 204 refers to any part of the vacuum chuck 200 that yields more easily to pressure than other portions of the vacuum chuck 200. In the depicted embodiment, the relatively deformable portion 204 is an air-filled bladder, but various embodiments may employ any suitable method for forming a deformable portion 204, including using another material with relatively lower hardness. In the depicted embodiment, the cavity 202 is formed with a generally cylindrical shape, which is often desirable because the curvature tends to produce less sharp pressure gradients than corners. However, other embodiments may use other shapes as well. Similarly, in the depicted embodiment, the relatively deformable portion is bowl-shaped with an elliptical cross-section formed to a certain depth. The dimensions of the cavity 202 and the relatively deformable portion 204 may be suitably selected to produce a desirably uniform pressure buildup on the seal 106, as indicated by modeling (such as finite element analysis) or pressure measurement. For example, the depth of the relatively deformable portion 204 may be selected to be at least twice the depth of the cavity 202.

What is claimed is:

1. A vacuum chuck, comprising:
 a first surface;
 a cavity formed in the first surface;
 a second surface opposite the first surface; and
 a relatively deformable portion disposed between the first surface and the second surface, wherein the vacuum chuck comprises a first resilient material and the relatively deformable portion comprises a second resilient material with a lower hardness than the first resilient material;
 wherein the relatively deformable portion comprises an air-filled bladder formed in the vacuum chuck.

2. The vacuum chuck of claim 1, wherein the first resilient material is polyurethane.

3. A system for affixing cover seals to hard disk drives, comprising:
 an arm;
 a vacuum chuck coupled to the arm comprising a first surface, a cavity formed in the first surface, a second surface opposite the first surface, and a relatively deformable portion disposed between the first surface and the second surface, wherein the vacuum chuck comprises a resilient material and the relatively deformable portion yields to pressure more easily than the resilient material; and
 a cover seal held to the vacuum chuck by suction,
 wherein the cavity and the relatively deformable portion are formed such that, as the force exerted on to press the vacuum chuck against a surface increases, a pressure against the surface is initially higher under the cavity than at outer edges of the vacuum chuck and, as the pressure increases, the pressure is distributed more toward the outer edges of the vacuum chuck.

4. The system of claim 3, wherein the cavity is generally cylindrical in shape.

5. A system for affixing cover seals to hard disk drives, comprising:
 an arm;
 a vacuum chuck coupled to the arm comprising a first surface, a cavity formed in the first surface, a second surface opposite the first surface, and a relatively deformable portion disposed between the first surface and the second surface, wherein the vacuum chuck comprises a resilient material and the relatively deformable portion yields to pressure more easily than the resilient material; and
 a cover seal held to the vacuum chuck by suction,
 wherein the relatively deformable portion is bowl-shaped.

6. The system of claim 5, wherein the relatively deformable portion has a depth at least twice that of a depth of the cavity.

7. The system of claim 5, wherein the relatively deformable portion comprises an air-filled bladder formed in the vacuum chuck.

8. The system of claim 5, wherein the resilient material is polyurethane.

9. The system of claim 5, wherein the resilient material is a first resilient material and the relatively deformable portion comprises a second resilient material with a lower hardness than the first resilient material.

\* \* \* \* \*